US007058546B2

(12) United States Patent
Jormalainen

(10) Patent No.: US 7,058,546 B2
(45) Date of Patent: Jun. 6, 2006

(54) SYSTEM AND DEVICE FOR MONITORING OF OCCUPANCY AREA

(75) Inventor: Janne Jormalainen, Kauniainen (FI)

(73) Assignee: Nokia Corporation, Espoo (FI)

( * ) Notice: Subject to any disclaimer, the term of this patent is extended or adjusted under 35 U.S.C. 154(b) by 101 days.

(21) Appl. No.: 10/729,474

(22) Filed: Dec. 5, 2003

(65) Prior Publication Data

US 2004/0164867 A1 Aug. 26, 2004

(30) Foreign Application Priority Data

Dec. 5, 2002 (FI) ................................ 20025059

(51) Int. Cl.
*G06F 17/00* (2006.01)

(52) U.S. Cl. ..................................................... 702/188

(58) Field of Classification Search ............ 340/573.3, 340/573.4; 702/188

See application file for complete search history.

(56) References Cited

U.S. PATENT DOCUMENTS

| | | | | |
|---|---|---|---|---|
| 5,963,130 | A * | 10/1999 | Schlager et al. | 340/540 |
| 6,232,916 | B1 | 5/2001 | Grillo et al. | 342/357.07 |
| 6,271,757 | B1 | 8/2001 | Touchton et al. | 340/573.1 |
| 6,353,743 | B1 | 3/2002 | Karmel | 455/456.5 |
| 6,922,728 | B1 * | 7/2005 | Cho | 709/227 |
| 2002/0196151 | A1 | 12/2002 | Troxler | 340/573.4 |

FOREIGN PATENT DOCUMENTS

| | | |
|---|---|---|
| DE | 10032020 A1 | 1/2002 |
| WO | WO-98/10538 A1 | 3/1998 |

* cited by examiner

*Primary Examiner*—Evan Pert
(74) *Attorney, Agent, or Firm*—Harrington & Smith,LLP

(57) ABSTRACT

The invention concerns a system for monitoring an occupancy area (15.1–15.3). The system includes the following elements. A device (10) that is arranged in connection with the monitored party (A–D) which device (10) includes localizing means (12), means of communication (13) for communication in a wireless data communication network (20.1–20.3), a processor unit (MCU) and a storage medium (16), wherein at least location information (23–25) defining the limit of the said occupancy area (15.1–15.3) is arranged, based on which the current status information of the monitored party (A–D) is adapted to be defined. A terminal equipment (22) that is arranged in connection with the monitoring party (21), and a wireless data communication network (20.1–20.3) as a means of communication between the said device (10) and the terminal equipment (22). The said location information (23–25) defining the occupancy area (15.1–15.3) is arranged for definition by the device (10), whose processor unit (MCU) is adapted to define the status information of the monitored party (A–D) at each time based on the current location information defined by the localizing means (12) and on the location information (23–25) arranged in the storage medium (16) and defining the limit of the occupancy area (15.1–15.3), and wherein, according to a criterion established for the said status information, the device (10) is adapted to transmit to at least one piece of terminal equipment (22) information in a form established by its means of communication (13). The invention relates also to the device (10).

13 Claims, 8 Drawing Sheets

SYSTEM AND DEVICE FOR MONITORING OF OCCUPANCY AREA

FIELD OF THE INVENTION

The invention concerns a system for monitoring an occupancy area, which system includes a device arranged in connection with the monitored party which includes localizing means, means of communication for communication in a wireless data communication network, a processor unit and a storage medium, wherein at least location information defining the limit of the said occupancy area is arranged, based on which the current status information of the monitored party is adapted to be defined, terminal equipment arranged in connection with the monitoring party, and a wireless data communication network as a means of communication between the said device and the terminal equipment.

In addition, the invention concerns a corresponding a device.

BACKGROUND OF THE INVENTION

Numerous such situations occur in everyday life, where the current location of a mobile party requiring monitoring may cause concern for the monitoring party. Many examples of such parties to be monitored can be found as regards both living and lifeless beings. Parents may feel concern for their children, the staff at old people's homes or at day nurseries for their wards, the master of the house for his pets and guards for their prisoners. Furthermore, examples of lifeless monitored objects include all kinds of transport vehicles, such as, for example, motorcars and boats.

Solutions of different kinds have been proposed for the monitoring party appointed beforehand in order to monitor the current location of such objects and in order to inform about any drifting out of such occupancy areas that may have been established for them. At the present time, the location of a mobile object can be defined with an accuracy of even a few metres by using the almost global GPS system. By using a wireless data communication network the location information corresponding with the location determined by the GPS system or information about any breach against the occupancy area established for the object can be easily relayed to the party appointed to monitor the object.

Numerous solutions have been proposed in printed patent specifications for monitoring both living and lifeless targets to make sure that they stay within the permitted occupancy area or to find out if they are heading into a prohibited occupancy area and to determine their location at each time. In the solution proposed in the printed US patent specification 2001/0052849 A1 (Jones, J R.) the monitored party carries with him a device equipped with the said GPS modules and modules allowing wireless communication. The device further includes a memory storing location information defining the borders of the occupancy area permitted or prohibited for the monitored party. The device processes data it has received from GPS satellites and compares the location information defined from it with the location information defining the occupancy area. For example, when the user moves over into a prohibited area, a notification is given to a special server, which relays it further to the terminal equipment of the appointed monitoring party. However, the solution in question is strongly based on a server-centred implementation. The monitoring party must perform on a server adjustment of the location information arranged in the devices and defining the occupancy area, from which server the information is then transferred to the memory of the device. In addition, the notification about crossing of the occupancy area border is given first to the server, through which the information is relayed to the appointed monitoring party.

Printed specification WO 01/73446 A1 presents another strongly server-centred solution. Here the monitoring party sends an inquiry to the server, which inquires about the location of the monitored party at the moment in question. However, in this implementation it is not possible to set up any location information defining the occupancy area, and thus it is not either possible to carry out automatic monitoring without the monitoring party having to send constant inquiries to the server concerning the location of the monitored object.

U.S. Pat. No. 6,243,039 B1 also presents a child location system. In this, too, it is possible to set up location information defining the occupancy area, whereby any breach against this will result in the carrying out of predetermined steps. In this implementation, too, the system also includes a WEB server or "call centre", in which the monitoring party establishes the location information defining the occupancy area. The server is used to process location information received from the device carried by the child, and this information is compared with the stored location information defining the occupancy area.

However, all the solutions presented above are difficult to implement and they are heavy considering the real usability of the device. From the viewpoint of the monitoring party it is often quite unessential to be aware of the location of the monitored object at each time, whereby this is just intended to have a certain kind of calming effect on the monitoring party. In reality, it would be sufficient for the monitoring party in several cases just to know that the object is within the occupancy area established as permitted for it. To implement this service only, special server-based solutions are very cost-intensive.

Furthermore, such a server-centred functionality for programming a device and for monitoring the location of its carrier at each time is not able to provide such a realistic usability that must be required of the service for such an integrated localizing and monitoring device to become a so-called "popular" means giving access to all without effort. Determination of the occupancy area, for example, through a WEB user interface or a "call centre" requires a heavy server-centred implementation to bring about the service, and hereby it entails unreasonable costs for the final users in order to obtain a constant monitoring service.

Still another significant problem relating to the localization-related applications presented above and also generally known applications is that the location information is in coordinate form. From the point of view of a user unfamiliar with the matter, it is very uncertain whether location information in coordinate form can be understood. In most cases it is in no way possible to outline the location of the monitored party from such location information.

SUMMARY OF THE INVENTION

It is the purpose of this invention to bring about such a system and device for monitoring of the occupancy area, which is especially easy to program and use even without any special server-centred implementation. In addition, the information on border crossing is obtained in a very illustrative form. The characteristic features of the system according to the invention are presented in claim 1 and those of the device in claim 7.

In the case according to the one embodiment of the invention, programming of the location information defining the occupancy area can be carried out with the device proper at a really realistic level. The monitoring party interested in the movements of the monitored party may carry out programming of the device simply by moving around in the concerned area carrying the device with him. The occupancy areas may be shaped in many different ways.

According to one embodiment, the notification about crossing of the occupancy area border is transmitted by the device according to the invention directly to the terminal equipment of the monitoring party. According to another embodiment, the transmission may be carried out, for example, in a packet-switched data communication network, whereby the costs caused by notification of the trespassing will remain reasonable for the party acquiring the service. In addition, the device is of a very simple structure, which can be implemented with existing components.

According to yet another embodiment, in the system according to the invention it is possible in a surprising manner to combine GPS localization and localization techniques based on wireless data communication networks, whereby a very user-friendly functionality is brought about. As one of its advantages, the monitoring party can get information on the monitored party's location, for example, as a location name, which is very illustrative compared with, for example, location information in coordinate form.

Other characteristic features of the system and device according to the invention emerge from the appended claims, and more advantages that can be achieved are listed in the description part.

BRIEF DESCRIPTION OF THE DRAWINGS

The system and device according to the invention are not limited to the embodiments to be presented hereinafter and they will be explained in greater detail by referring to the appended figures, wherein.

DETAILED DESCRIPTION OF THE INVENTION

Figure 1:
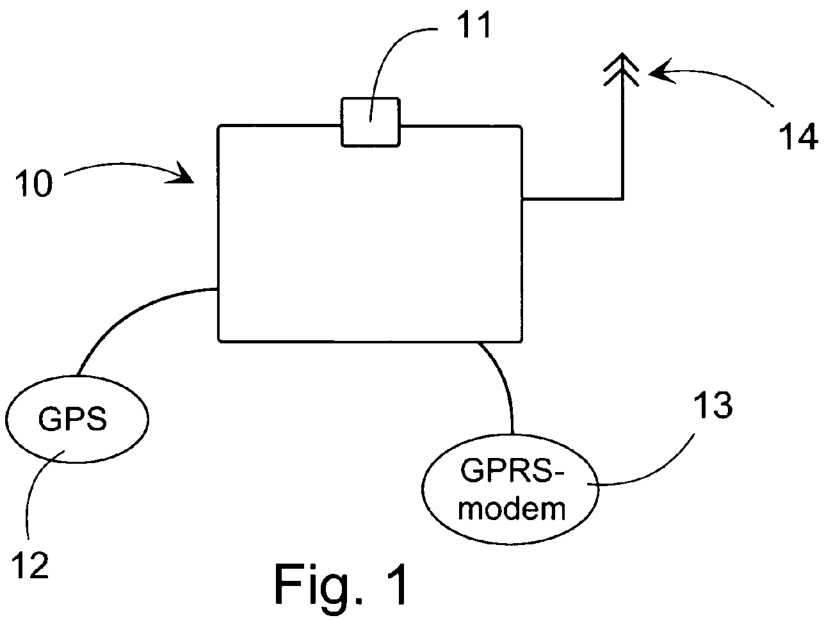
FIG. 1 is a schematic view of the functionalities of the device.

FIG. 1 is a schematic view of an example of the functionalities arranged in the device 10 according to the invention. Device 10 includes a locating functionality 12, which as regards its geographic coverage may be based, for example, on the almost global GPS (Global Positioning System). Other systems may also be possible. Mobile station technologies of known kinds or such which are being developed may also be used in the positioning in order to give it additional security or even replacing the GPS. One example of such is the E-OTD (Enhanced Observed Time Difference) positioning system or so-called network-assisted GPS, that is, A-GPS (Assisted GPS). A-GPS is a combination of satellite and network localization, wherein the mobile communication network gives assisting information to the receiver in order to speed up the localization and to make it more accurate. Device 10 also includes at least a transmitter functionality 13 and preferably besides this also a receiver functionality. As an example of such transmitter-receiver functionality the GPRS 13 (Group Packet Radio System) is presented, which is known from the wireless data communication network technology, that is, the packet-switched way of transferring data. Other solutions based on known technologies (CDMA, TDMA, WDMA, FDMA) and technologies being developed are also possible.

In order to allow both the positioning and the transmitter/receiver functionality 12, 13, the device 10 also includes antenna means 14. The antenna means 14 may be separate ones for GPS and GPRS modules 12, 13. In addition, device 10 has a user interface of some level, which in its simplest form may be a press-button switch 11, in order to store the location information defining the occupancy area. The press-button switch 11 is arranged in such a way that while the device 10 is in use it can be protected or locked in order to prevent false pressing. The case of device 10 may also include fastening means to fasten the device 10, for example, to the carrying person's clothing (not shown).

Figure 2:
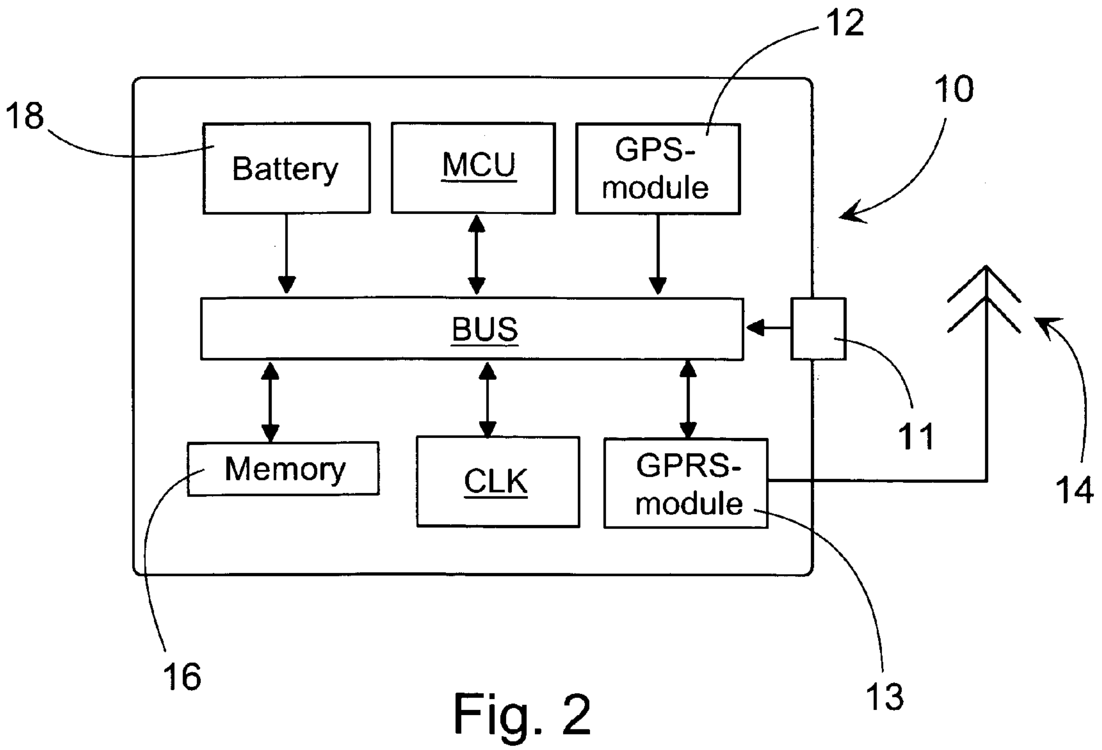
FIG. 2 is a schematic view of an example of the device according to the invention.

FIG. 2 is a somewhat closer schematic view of an example of the functional components of the device 10. It should be noted that FIG. 2 shows only one embodiment of the device 10 by way of example, whereby it does not necessarily show all components, for example, such that are obvious as such to the professional in the art. Thus, besides the mentioned GPS and GPRS modules 12, 13, device 10 also includes a processor unit MCU and a storage medium 16. In storage medium 16 are stored, among other things, the program code bringing about the functionality of device 10 and run by processor unit MCU and the location information defining the occupancy area.

Processor MCU may be a microprocessor unit of a kind known as such and the program code may consist of a set of commands to be carried out by microprocessor MCU in the established order, which commands bring about the functionality essential to device 10. A functionality brought about partly or entirely at hardware level is also a possible manner of implementation.

Device 10 further includes an exchangeable or chargeable power source 18. For timing of functions, a clock circuit CLK and all modules are connected to a bus BUS. Besides the foregoing, device 10 may also include other functional modules obvious to the professional from the known technology, such as, for example, a display unit, a cue light (or several), a loudspeaker, a microphone or several press-buttons or switches (not shown).

Figure 3A:
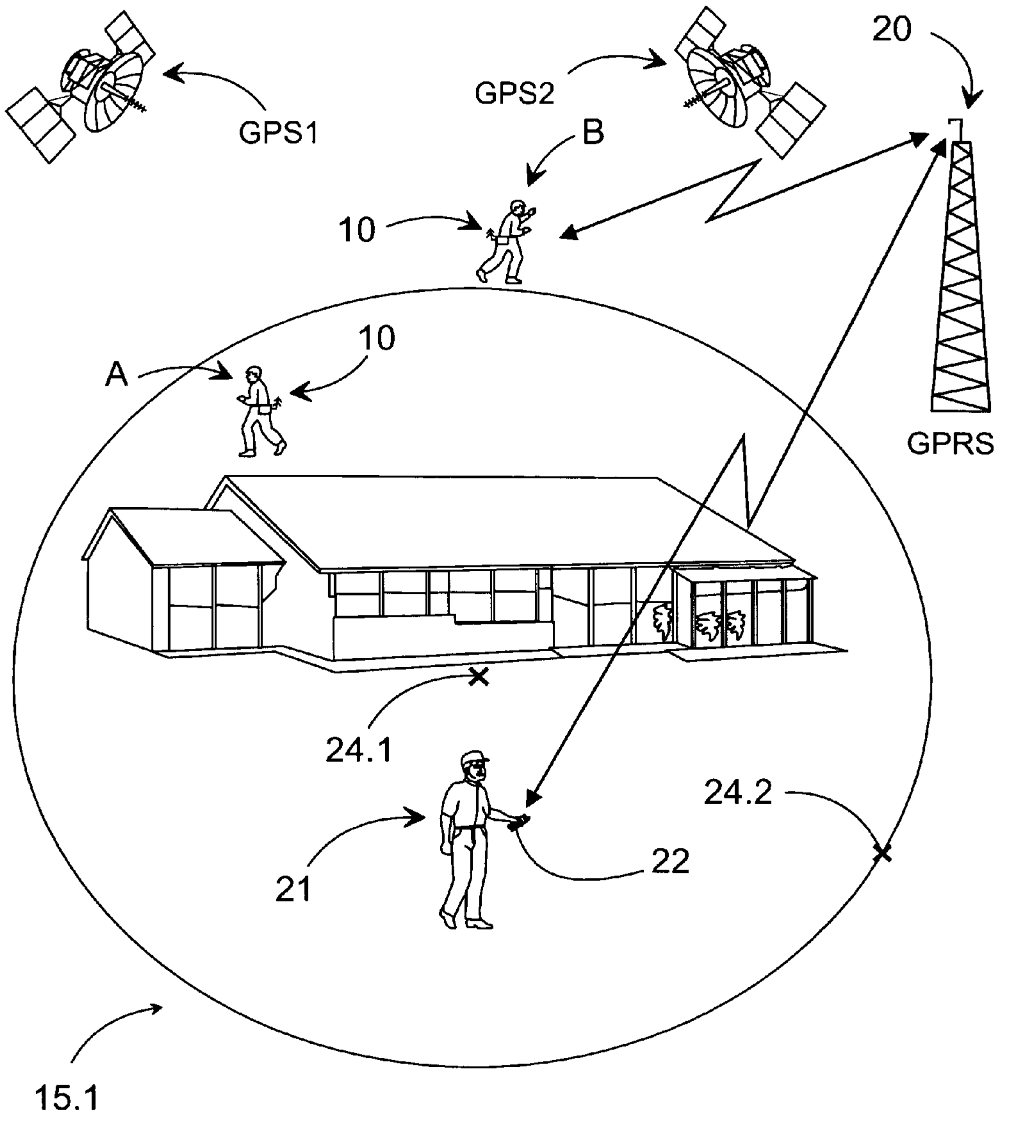
FIG. 3*a* shows a first application example of how the device according to the invention is used.
Figure 3B:
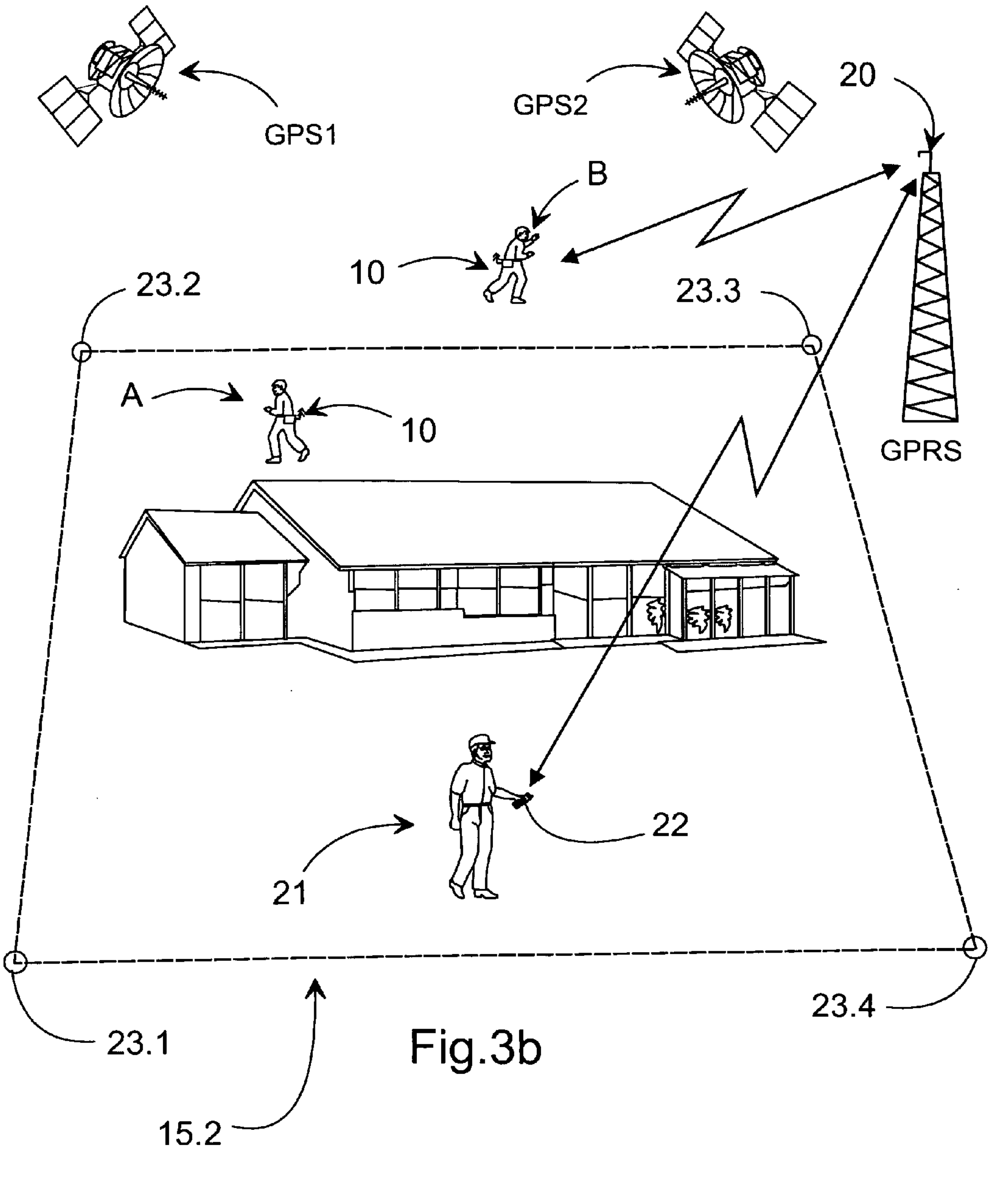
FIG. 3*b* shows another application example of how the device according to the invention is used.
Figure 3C:
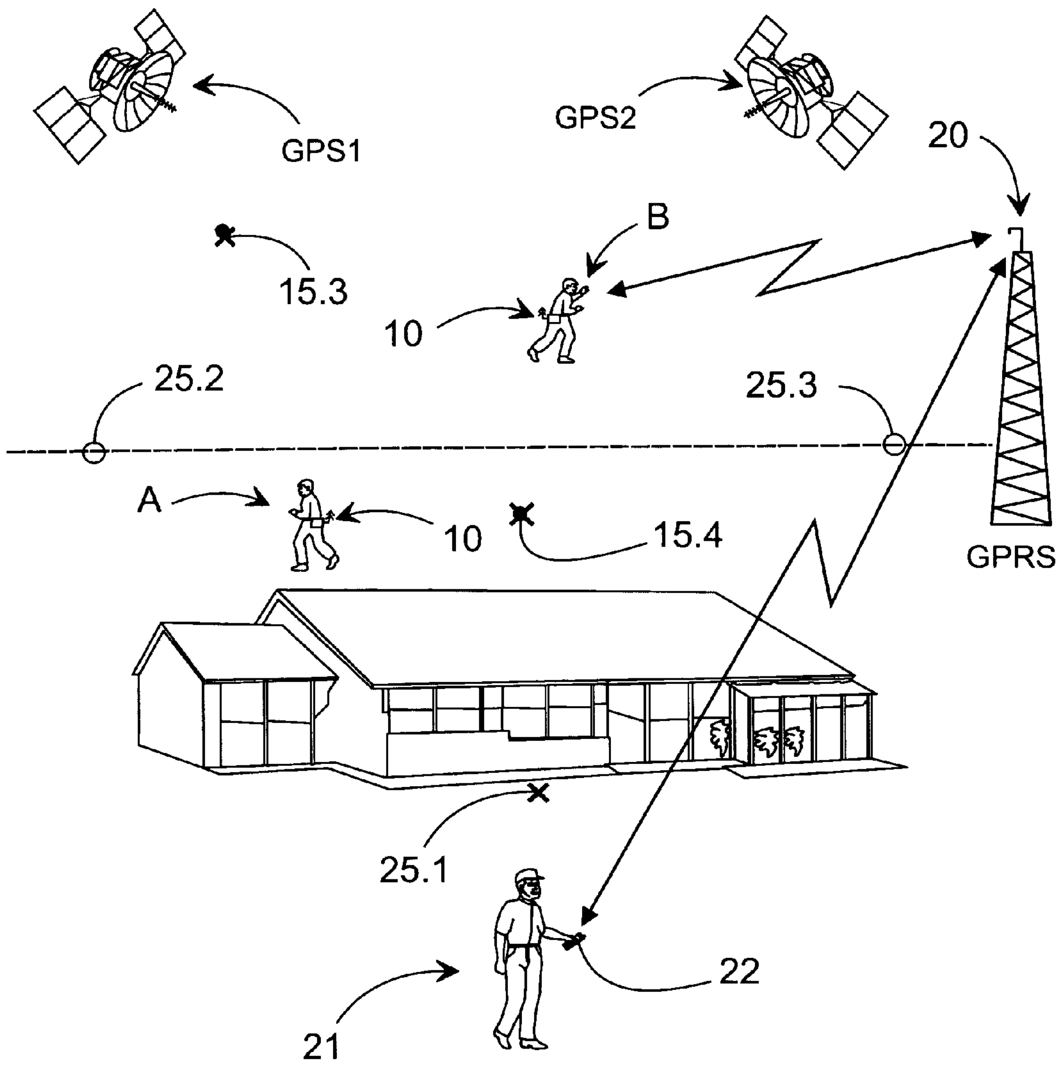
FIG. 3*c* shows a third application example of how the device according to the invention is used.

FIGS. 3*a*–3*c* show some in-no-way-limiting application examples of how the device 10 according to the invention is used. In these examples, the children A, B of a family are the monitored party. The monitoring party is, for example, one of the children's parents 21. The children A, B are carrying with them a device 10 according to the invention. Device 10 may be, for example, in the child's A, B pocket or it may be arranged in some manner, for example, in the child's clothing. The adult 21 has, for example, a piece of mobile terminal equipment 22 of an ordinary kind as such, which can be used for communicating in a wireless data communication network 20. The basic technology of the wireless data communication network 20 is obvious to the professional in the art.

The operation of the device 10 according to the invention is explained in the following. The device 10 according to the invention may be used for monitoring to make sure that the monitored party A, B remains within the occupancy area 15.1, 15.2, which is defined as permissible for it (in FIGS. 3*a* and 3*b*), or, alternatively, that the party B remains outside the occupancy area 15.3 defined as being out of bounds for it (FIG. 3*c*). In doing the configuration of device 10, the monitored area 15.1–15.3 may be established as being either permissible or forbidden. Programming of the device 10 is done at the start when putting the device 10 in operation for the first time or when updating a new occupancy area 15.1–15.3 for the monitored party A, B.

Programming of the location information to be stored in device 10 and defining of the permitted or forbidden occupancy area 15.1–15.3 may be done in the simplest way by using just one press-button 11, where the definition and storing steps of the location information of points defining the occupancy area 15.1–15.3 may be identified, for example, by the duration in time of the pressing applied to press-button 11. Furthermore, for additional clarity, in the case of different information it is possible to flash one or more cue lights at a varying frequency. It is also possible to give various kinds of sound signals. There are numerous different ways of expressing and determining the different steps of programming, so they are not dealt with any further in this context.

FIG. 4*a* is a flow diagram showing an example of programming of the device, more particularly of storing in the device 10 of the location information defining the occupancy area 15.1–15.3. After switching device 10 on (401), its need for any initialization measures is first checked. If device 10 detects pressing of programming button 11 corresponding to initialization measures, which pressing may, for example, consist of two brief and essentially successive pressings of programming button 11 (402), the procedure continues with programming of the location information defining the occupancy area 15.1–15.3.

Thus, initialization steps are first carried out on device 10 (403), whereby, for example, any location information stored in device 10 and defining its occupancy area at the time is deleted from its memory 16.

FIG. 3*a* shows a first embodiment, where the occupancy area 15.1 permitted for children A, B is circular in shape. In the case of such an area, depending on the software implementation of device 10, the first point to be programmed could be, for example, the central point 24.1 of the circular occupancy area 15.1 or a point essentially close to its real centre. In the application example, central point 24.1 is the home yard of the children A, B. The device 10 is taken to the said point 24.1, where it is used to determine the geographical location information 24.1' of the said point (step 404). The circumstance that in this case the storing concerned points defining a circular area 15.1 may again be expressed to the device 10, for example, by the duration of pressings of programming button 11. Device 10 may identify storing of the central point 24.1 of area 15.1, for example, from an essentially prolonged pressing of programming button 11 (for example, 3 seconds) (405).

The location information 24.1' of the central point of this circular or generally radial area 15.1, as also of other points defining the occupancy area, can be computed, for example, from GPS data received by the device's 10 GPS module 12, which data is received from GPS satellites GPS1, GPS2 in space (a technology obvious to the professional in the art). The location information 24.1' is stored in storage medium 16, wherein it is referred to by a parameter signifying the central point of circle 15.1 (406.1).

Next, device 10 is taken to the circumference 24.2 of area 15.1 (404). In this case, the definition and storing of the location information corresponding with the outer circumference 24.2 of area 15.1 may be identified, for example, by a pressing of press-button 11 of essentially shorter duration than in the case of the central point 24.1 of area 15.1 (405). At point 24.2 of the circumference a corresponding GPS definition is carried out as well as storing of the location information 24.2' in memory 16 (406.2). Completion of the programming is made known to device 10 by a pressing in accordance with the established criterion, which pressing may be, for example, an essentially prolonged pressing of button 11 (over 5 seconds) (407). Programming is then completed (408) and by way of other possible configuration settings (not shown) device 10 transfers into the operating mode (501, FIG. 5), unless it is switched off.

FIG. 3*b* shows an embodiment where the occupancy area 15.2 is angular (a square in this case). In this embodiment, the initialization steps of device 10 (403) are followed by taking it in a freely chosen order to each corner 23.1–23.4 defining the area 15.2. The fact that device 10 identifies as a polygon the area 15.2 now to be programmed may be set to take place in such a way that now the press-button switch 11 is not used at all to carry out any prolonged pressing causing storing of the central point 24.1 (405). At each corner 23.1–23.4 GPS definition of the location information corresponding with the point is carried out as well as storing into the storage medium 16 (406.2). At each point 23.1–23.4 a short pressing of programming button 11 is done, whereby the area 15.2 is identified as a polygon. The programming may now also be finished with a pressing in accordance with the established criterion, which may be, for example, a long pressing of press-button 11 (over 5 seconds) (407). Instead of defining corners, device 10 may be used also to define and store straight lines defining the edges of area 15.2, whereby the corresponding corners may be calculated from their intersection points.

FIG. 3*c* shows a third application example wherein the forbidden occupancy area 15.3 established for the children A, B is located in one direction (for example, a lake area). Area 15.3 is defined by a borderline. In this case, after the initial steps (401–403) already presented above in order to define the side of the permitted area 15.4 the device is taken from the area 15.4 to a freely chosen spot 25.1 (404), where a prolonged pressing is applied to press-button 11 (for example, set at over 3 seconds) (405). Device 11 is used to define location information corresponding with point 25.1 and this information is stored in memory 16 (406.1).

Next, the device 10 is taken to the borderline defining the forbidden and permitted occupancy area 15.3, 15.4 to a first freely chosen spot 25.2 (404). Device 10 is used to define and store first location information defining the borderline (406.2). Next, the storing is acknowledged by a short pressing of press-button 11 (407) and the device is taken to a second spot 25.3 defining the borderline (404), where a short pressing of press-button 11 is again carried out (405), in consequence of which the corresponding location information is defined and stored (406.2).

Now when that location information has been stored, which is required to define the borderline separating the forbidden and the permitted occupancy area 15.3, 15.4, the device may be notified of completion of the location programming procedure with a long pressing of press-button 11

(407). This is followed by steps (408->), as was presented above. Although the establishment of borders for the occupancy area has been described above as based on the GPS system, it may as well be carried out based on mobile localization techniques or as a joint function of these. As an example with reference to FIG. 6, localization may hereby be done based on one or more base transceiver stations 20.1–20.3 (cellular localization), whereby it is possible, for example, based on field strengths of base transceiver stations 20.1–20.3 or on signal strengths sent by device 10, to determine the border points 23.1–23.4 defining the area 15.1.

After storing of the location information defining the occupancy area, various configuration steps may be performed on device 10, such as, for example, storing of connection settings. For the GPRS module 13 attending to the data communication carried out from device 10 a subscriber identity or such is defined, which identifies it unambiguously in the data communication network 20. The connection settings may be done, for example, on the monitoring party's 21 mobile terminal equipment 22 in such a way that it is used to send a SMS message of a determined form to the device's 10 GPRS module 13. From the SMS message the GPRS module 13 stores the connection information in the device's 10 memory 16, such as, for example, the subscriber identity identifying the mobile station 22 of the monitoring party 21.

The SMS message may also be used to convey other data essential for the configuration of device 10. An example of this is the repeating frequency of the GPS definition, the contact information of monitoring parties changing according to the time of day and night, and other functions known to the professional in the art from the technology in question.

Device 10 may send an acknowledgement indicating a successful programming of the connection settings and other configurations and ensuring successful storing of the settings.

Although in the examples presented in the foregoing the device 10 was programmed by one single press-button 11, device 10 may of course also include a more advanced user interface for defining and storing the location information and for supplying the configurations to it.

In the following, the operation of device 10 will be explained by referring to the application examples of FIGS. 3*a*–3*c* and to flow diagram 5. When device 10 is switched on (401), it may carry out a possible self-test, during which it is possible also to supervise pressings of press-button 11 in case of a possible initialization and re-programming of the location information (402). The GPS module 12 is then used to receive GPS data transmitted at established intervals by GPS satellites GPS1, GPS2 (501). The technology to do with the GPS system is obvious to the professional in the art, and there is no need to explain it any deeper in this context. Reception of GPS data can be set to take place when the configuration of device 10 into operating condition is done, for example, every fifth minute, which is then controlled by the device's 10 timer circuit CLK. The data received by GPS module 13 is given as input to processor unit MCU, which uses it to carry out the necessary arithmetic operations in order to determine the geographical location of device 10. On the other hand, depending on the modular implementation of device 10, the GPS module 13 itself may also carry out the concerned arithmetic operations with the GPS data, whereby the data to be given as input to processor unit MCU is directly interpretable location information.

Next, the device's 10 processor unit MCU defines the status information, wherein a comparison is made of the carrying person's A, B current location with the occupancy area determined by the stored location information, which occupancy area is thus defined inside or outside the definition points established for it. When the occupancy area is circular, processor unit MCU does a software examination to find out whether the current location defined from the GPS data is within the occupancy area 15.1. More specifically, the program compares mathematically the circle equation formed of the definition points (the central point and any freely chosen point on the circle's circumference) with the current location of object A, B.

Even more simply, the possibility to examine the location of object A, B in the case of a circular area can be realized in such a way that, for example, the programming step is completed by a calculation of the distance between the central point 24.1 and a point 24.2 on the circumference, whereby the radius of the circular area is obtained and it is also stored in the memory 16 of device 10. Now when examining the permissibility of the object's A, B location at the time the distance is calculated between the area's 15.1 central point 24.1 and the location at the time. If the obtained distance exceeds the radius defined for area 15.1, this means that object A, B is not hereby within the permitted occupancy area 15.1. Device 10 will hereby carry out the predetermined functions established for it (503). Other algorithmic implementations of the program are also obvious to the professional in the art in the case of a circular occupancy area 15.1.

If the object's A, B permitted occupancy area 15.2 is a polygon as shown in FIG. 3*b*, then definition of the current location may be carried out in a corresponding manner as was presented above in the case of the circular occupancy area (501). It is now possible to do, for example, software calculations of the equations of straight lines defining the occupancy area 15.2, and as regards these a comparison is made of the current location of the monitored party A, B (502). If the location is not inside the area 15.2 limited by the straight lines, device 10 will carry the predetermined functions established for it (503).

If the permitted occupancy area 15.4 of object A, B is limited by a borderline defined from one direction, as in FIG. 3*c*, it is possible also hereby to carry out the definition of the current location in a corresponding manner as was presented above in the case of a circular and polygonal occupancy area 15.1, 15.2 (501). It is now possible to do a program definition of the equation of the borderline separating the occupancy areas 15.3, and as regards this equation a comparison is made of the current location of the monitored party A, B (502). If the location is not on the permitted side of the area 15.1 limited by the straight lines, as defined by the stored location 25.1, device 10 will carry out the predetermined functions established for it (503).

The said predetermined function (503) may be, for example, an SMS message of standard form concerning a breach of the permitted occupancy area 15.1, 15.2, 15.4 ("N.N in the forbidden area!"), which is sent by the GPRS module 13 to the mobile station 22 of the monitoring party 21. Furthermore, a sound signal may also be given in the device 10 itself to make the trespassing known to the monitored object A, B.

Further, according to another embodiment, in device 10 the GPRS module is used to edit the SMS message to be sent to the monitoring party's 21 mobile station 22, which message notifies both of the trespassing and also of the current location of party A, B ("N.N in the forbidden area! N60 12.6888 E022 56.4561") (504). If the monitoring party's 21 mobile station 22 is provided with GPS characteristics of known kinds and map sides can also be downloaded in it, the location of the monitored party A, B can be localized immediately on the map based on the received location information.

Figure 6:
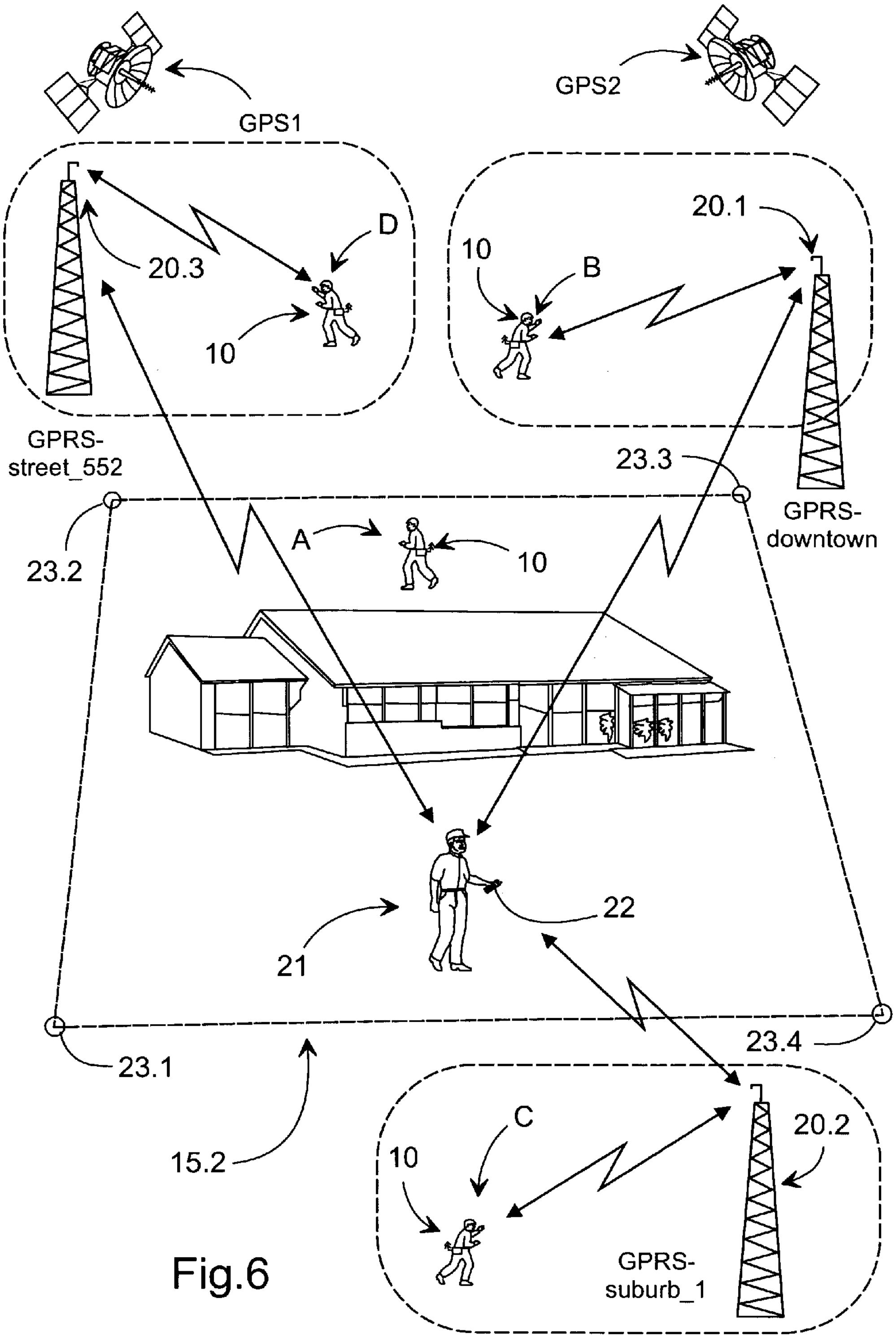
FIG. 6 shows an embodiment of use of the device according to the invention applied to mobile localization techniques.

Further, with reference to FIG. 6 according to another more advanced embodiment, when crossing of a border has occurred information on the location of the monitored party B–D may be sent to the mobile station 22 of the monitoring party 21 based on the cellular location information of device 10 which, can be obtained from data communication network 20.1–20.3. Hereby the monitoring party 21 can be provided with especially informative data about the location of the monitored party B–D, for example, in comparison with pure location coordinate data.

As is known, present-day mobile station networks provide identifiers of base transceiver stations 20.1–20.3 or other such network elements under the names of their places of location. Hereby each base transceiver station 20.1–20.3 may be named according to, for example, the city quarter or even more accurately according to street names. The location information of the monitored party A–D as such identifiable geographical location information is considerably more practical and easier to understand than, for example, as pure GPS coordinates.

There are numerous ways of forming location information based on mobile network emissions and of supplying the information to the mobile station 22 of the monitoring party 21. Firstly, location information can be formed, for example, according to one (for example, the most powerful) base transceiver station (cellular information), in whose area the carrier B–D of device 10 is located. This can be used for determining the location of device 10, for example, with city quarter accuracy (downtown, shopping_mall__1, suburb__1, suburb__2, etc.). Of course, location information which is formed based on several base transceiver stations 20.1–20.3 may be utilized, whereby the location information may be, for example, in (552_street-554_street) form, which can be deduced from the location of device 10 in relation to base transceiver stations 20.1–20.3.

In a first embodiment, in order to get border-crossing information to the mobile station 22 of the monitoring party 21, the device 10 of the monitored party B–D may be programmed upon occurrence of a border crossing to send to mobile communication system 20.1–20.3, for example, an SMS message in a certain form. To implement this it is possible to apply, for example, an automatically triggered SAT (Sim Application Toolkit) facility. In mobile communication system 20.1–20.3 the SMS message of a given form brings about localization of device 10 based on base transceiver station information 20.1–20.3 (cellular information), which in the geographically understandable form of the kind described above is then relayed, for example, to the mobile station 22 of the monitoring party 21. To make this possible, the SMS message may also include the contact information of the mobile station 22 of the monitoring party 21 and the mobile network system 20.1–20.3 may include the relaying functionality that relays this location information to the mobile station 22.

Figure 7:
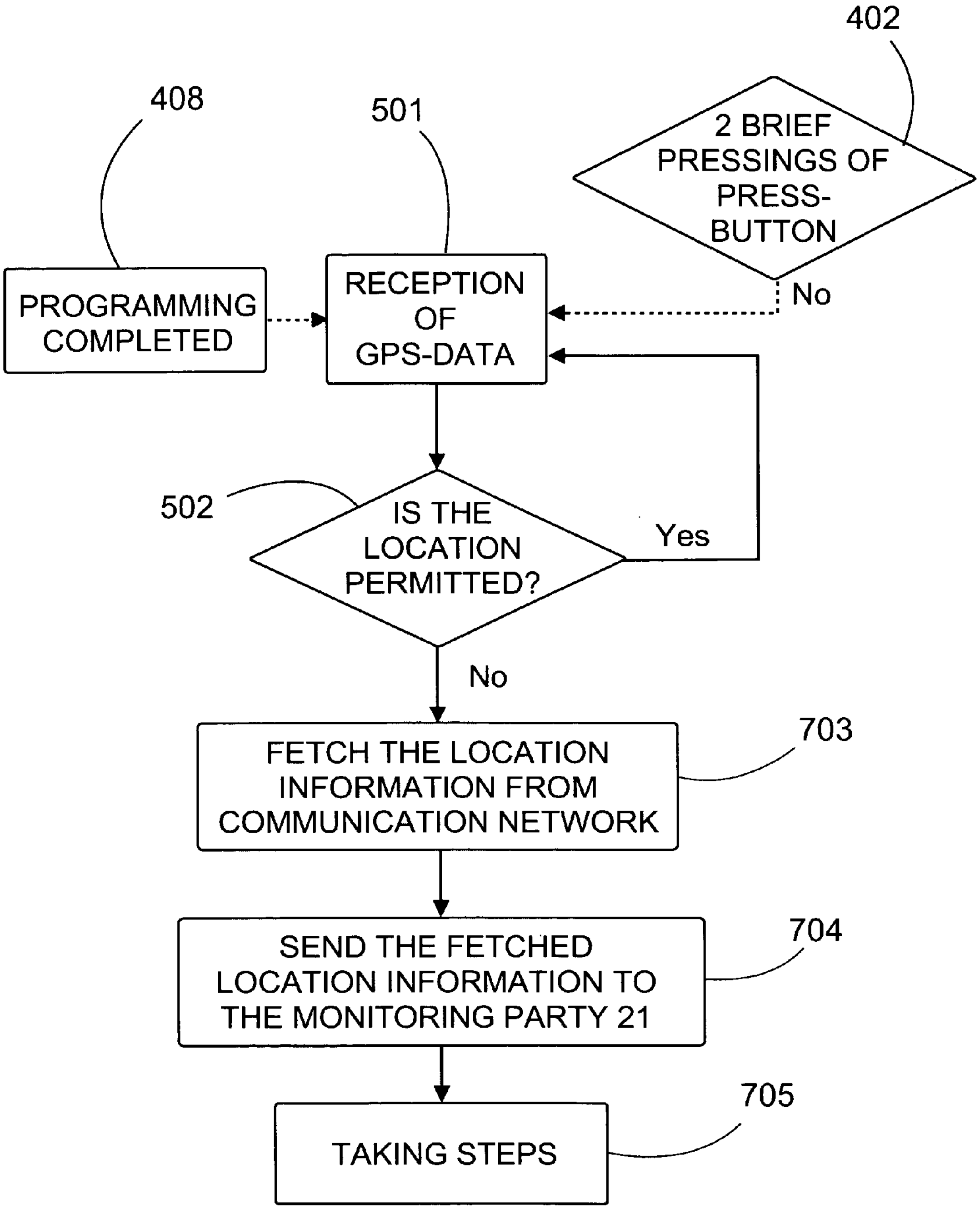
FIG. 7 is a flow chart showing another example of the operation of the device according to the invention in the operating mode.

FIG. 7 shows another way of implementation relating to mobile station localization. Also in this case after a border crossing noticed in device 10 (stage 502) device 10 may send an SMS message of a given form to the mobile communication system 20.1–20.3. In this case, the mobile communication system 20.1–20.3 will return the location information to the device 10 of the monitored party B–D (stage 703). Next, the device 10 of the monitored party B–D will send a notification of the border crossing to the mobile station 22 defined in its settings to the monitoring party 21 (stage 704). The notification also includes the cellular information received by the device 10 at stage 702. In order to implement this embodiment, it is not necessary to provide the mobile communication system 20.1–20.3 with any special functionalities specified for monitoring of occupancy areas, because such a cellular localization functionality, for example, based on base transceiver station information, is nowadays almost without exception part of the standard functionalities of systems.

Although wireless mobile station networks were described above, it is also possible to apply wireless local area networks (WLAN, Bluetooth) in the system and device according to the invention. With these even more accurate location information may be achieved. Joint application of wireless mobile station networks and local area networks is also possible.

According to an embodiment, the monitoring party 21 can also use his mobile station 22 to send information to device 10. In the simplest form, an SMS message of a specific form may be sent, which brings about a sound signal and flashing of a cue light in device 10. The parties A, B, 21 may have agreed between themselves that on receiving the signal the monitored party shall try to go home immediately (505). More advanced functions are also possible.

The system and device 10 according to the invention were described above in the light of individual application examples.

Figure 4:
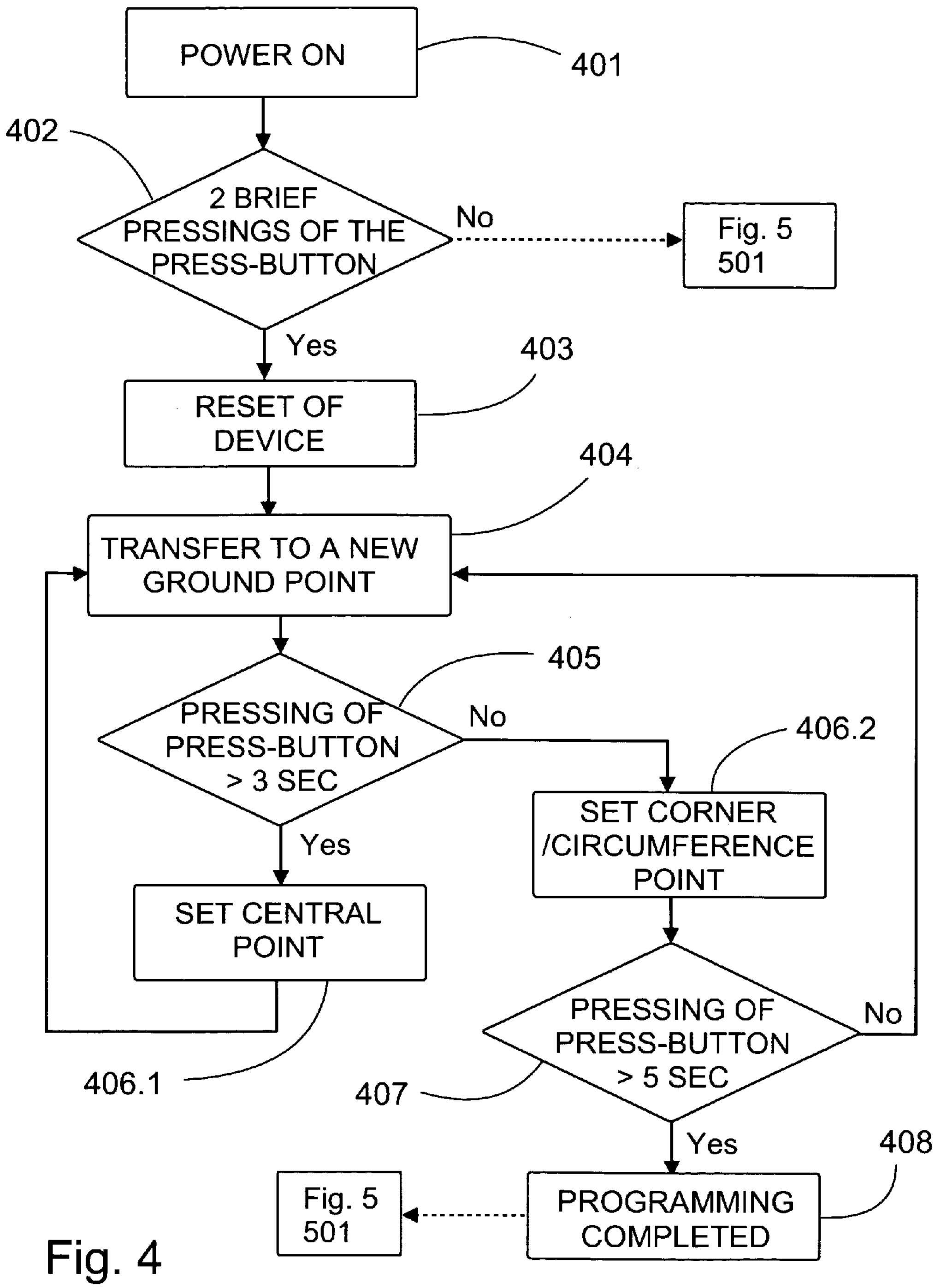
FIG. 4 is a flow chart showing an example of the operation of the device according to the invention in the programming mode.
Figure 5:
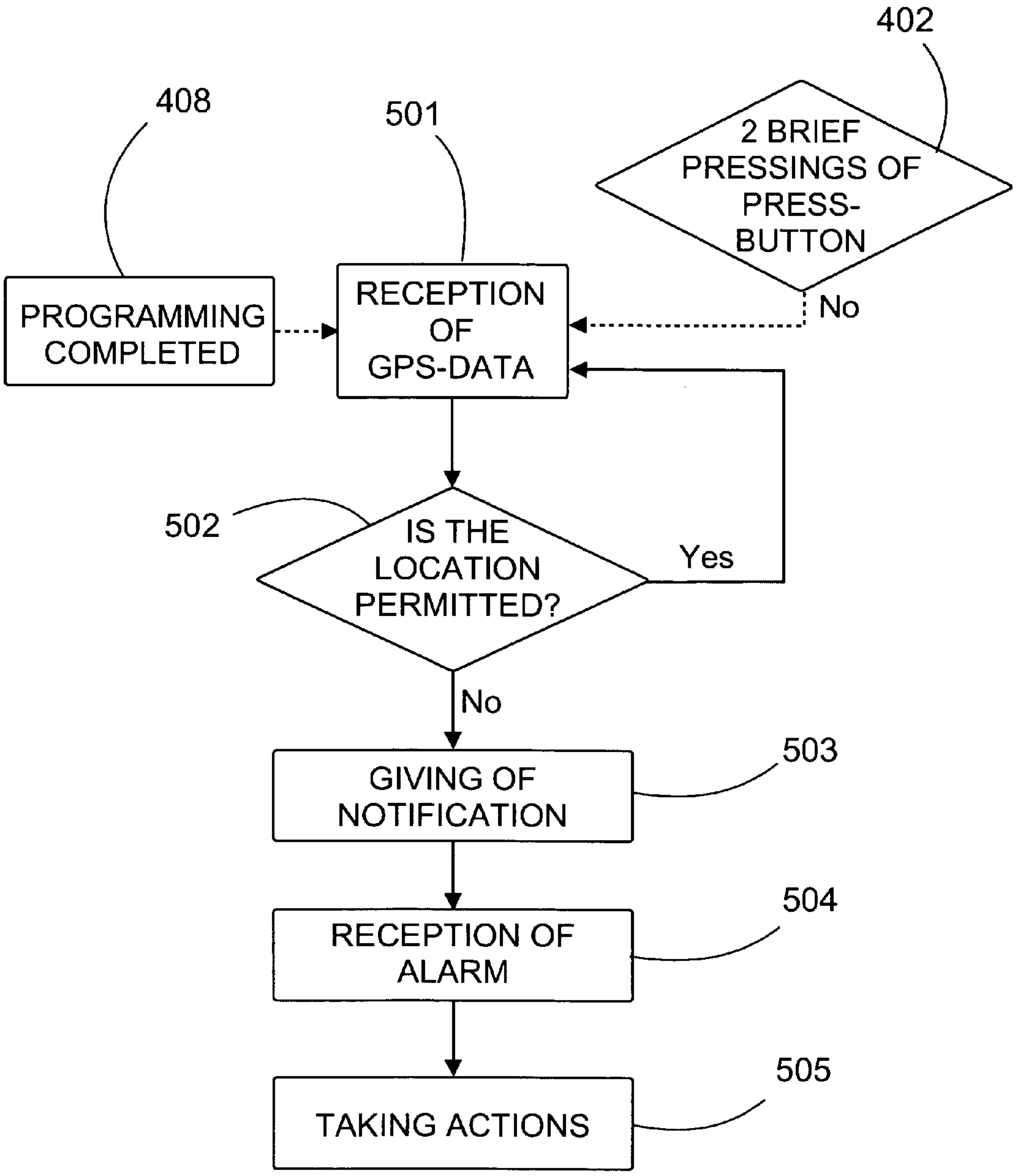
FIG. 5 is a flow chart showing an example of the operation of the device according to the invention in the operating mode.

It should be noted that especially the programming steps shown in FIG. 4 and the flow diagrams shown in FIGS. 5 and 7 and describing the use are only given by way of example, whereby it is self-evident that the procedural steps of operation for implementation the invention may include, besides those presented above, also subordinated steps, or some steps may be omitted or replaced by others, and in some cases they may also be carried out in orders different from those above. What is essential in the system and device according to the invention is that the location information defining the occupancy area is defined by the device 10 itself and that the information on crossing of the occupancy area border can be given in a very illustrative form based on the geographical location of the device in relation to a wireless data communication network. Although the invention has described above to a high degree as a server-less implementation, this does not exclude the use of special servers in the activation, operation and control of the monitoring functionality.

It should be understood that the foregoing description and the figures relating to it are only intended to illustrate the system and device according to the present invention. Thus, the invention is not limited only to the embodiments presented above or to those defined in the claims, but many such different variations and modifications will be obvious to the professional in the art, which are possible within the scope of the inventive idea defined by the appended claims.

What is claimed is:

1. System for monitoring an occupancy area (15.1–15.3), which system includes a device (10) arranged in connection with the monitored party (A–D) which includes localizing means (12), means of communication (13) for communication in a wireless data communication network (20.1–20.3), a processor unit (MCU) and a storage medium (16), wherein at least location information (23–25) defining the limit of the said occupancy area (15.1–15.3) is arranged, based on which the current status information of the monitored party (A–D) is adapted to be defined, terminal equipment (22) arranged in connection with the monitoring party (21), and a wireless data communication network (20.1–20.3) as a means of communication between the said device (10) and the terminal equipment (22), and in which system the said location information (23–25) defining the occupancy area (15.1–15.3) is arranged for definition by the device (10), whose processor unit (MCU) is adapted to define the status information of the monitored party (A–D) at each time based on the current location information defined by the localizing means (12) and on the location information (23–25) arranged in the storage medium (16) and defining the limit of the occupancy area (15.1–15.3), and wherein, according to a criterion established for the said status information, the device (10) is adapted to transmit to at least one piece of terminal equipment (22) established form information by its means of communication (13), characterized in that the said established form information is network location information defined by using one or several network elements (20.1–20.3) which operation of the elements (20.1–20.3) is based on the wireless data communication network (20.1–20.3) technology in which area of the network elements (20.1–20.3) the device (10) is located.

2. System according to claim 1, characterized in that the said terminal equipment is a piece of mobile terminal equipment(22) of a kind known as such.

3. System according to claim 1, characterized in that identifier information of the terminal equipment (22) is arranged in the device (10).

4. System according to claim 1, characterized in that a packet-connection module (13) is arranged in the device (10) as the means of communication.

5. Device according to claim 1, wherein the occupancy area is defined through a central point and a radius.

6. Device according to claim 1, wherein the occupancy area is defined as a polygon.

7. Device according to claim 1, wherein the occupancy area is determined by moving the device (10) to at least one geographical location.

8. Device (10) for monitoring of an occupancy area (15.1–15.3), wherein the device (10) arranged in connection with the monitored party (A–D) includes localizing means (12), means of communication (13) for communication in a wireless data communication network (20.1–20.3), a processor unit (MCU) and a storage medium (16), wherein at least location information (23–25) defining the limit of the said occupancy area (15.1–15.3) is arranged which location information is arranged for definition by the device (10), based on which the current status information of the monitored party (A–D) is adapted to be defined, and wherein according to a criterion established for said status information, the device (10) is adapted to transmit to at least one piece of terminal equipment (22) established form information by its means of communication (13), characterized in that the said established form information is network location information defined by using one or several network elements (20.1–20.3) which operation of the elements (20.1 20.3) is based on the wireless data communication network (20.1–20.3) technology in which area of the network elements (20.1–20.3) the device (10) is located.

9. Device according to claim 8, characterized in that the device (10) is fitted to perform steps in order to define its location in the wireless communication network (20.1–20.3).

10. Device according to claim 8, characterized in that a packet-connection module (13) is arranged in the device (10) as the means of communication.

11. Device according to claim 8, wherein the occupancy area is defined through a central point and a radius.

12. Device according to claim 8, wherein the occupancy area is defined as a polygon.

13. Device according to claim 8, wherein the occupancy area is determined by moving the device (10) to at least one geographical location.

* * * * *